(No Model.)
W. P. NICHOLS.
MEAT TENDERER.
No. 440,603. Patented Nov. 11, 1890.
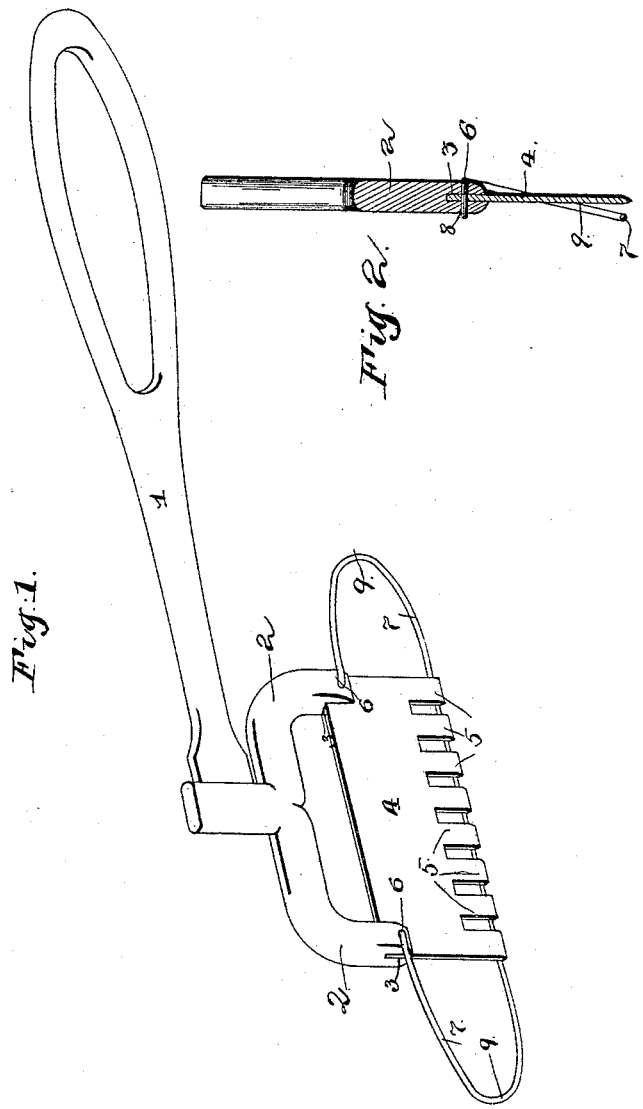

UNITED STATES PATENT OFFICE.

WILLIAM P. NICHOLS, OF BOLIVAR, MISSOURI, ASSIGNOR OF ONE-HALF TO JASPER N. SPERRY, OF SAME PLACE.

MEAT-TENDERER.

SPECIFICATION forming part of Letters Patent No. 440,603, dated November 11, 1890.

Application filed August 13, 1890. Serial No. 361,874. (No model.)

*To all whom it may concern:*

Be it known that I, WILLIAM P. NICHOLS, a citizen of the United States, residing at Bolivar, in the county of Polk and State of Missouri, have invented a new and useful Meat-Tenderer, of which the following is a specification.

The invention relates to improvements in meat-tenderers.

The object of the invention is to provide a simple and inexpensive meat-tenderer adapted to be readily used on various kinds of meat whether free from bone or otherwise without having its points stick to the meat.

The invention consists in the construction and novel combination and arrangement of parts hereinafter fully described, illustrated in the accompanying drawings, and pointed out in the claim hereto appended.

In the drawings, Figure 1 is a perspective view of a meat-tenderer embodying the invention. Fig. 2 is a transverse sectional view.

Referring to the accompanying drawings, 1 designates a handle constructed of metal and having formed integral with one of its ends a pair of oppositely-curved arms 2, having their outer ends arranged parallel with each other and perpendicular to the handle and provided with slots 3, adapted to receive a blade 4. The blade 4 is constructed of steel and provided with a series of teeth 5, and has its opposite edge arranged in the slots 3 of the arm 2 and the blade is secured in the arm by the ends 6 of a spring 7, which ends are passed through perforations 8 of the arms and the blade is clinched against the arm. The spring extends along the teeth of the blade a short distance from their cutting-edges and prevents the teeth sticking to the meat, and the said spring is extended beyond the ends of the blade and is bent to form loops 9.

It will be seen that the meat-tenderer is simple and inexpensive in construction and is adapted to be used on various kinds of meat whether free from bone or otherwise, and there is no liability of its teeth sticking to the meat.

From the foregoing description and the accompanying drawings the construction, operation, and advantages of the invention will readily be understood.

What I claim is—

A meat-tenderer comprising the handle, the oppositely-curved arm formed integral with one end of the handle and having their outer ends parallel and provided with slots and having perforations 8, the blade arranged in the slots, and the spring passing through the perforations 8 and securing the blade in the slots and extending along the teeth and beyond the ends of the blade and bent to form loops 9, substantially as described.

In testimony that I claim the foregoing as my own I have hereto affixed my signature in presence of two witnesses.

WILLIAM P. NICHOLS.

Witnesses:
J. N SPERRY,
E. L. SCHOFIELD.